Oct. 3, 1961 R. P. HULSEBUS Re. 25,048

OUTBOARD MOTOR TILT RELEASE

Original Filed Aug. 3, 1955 3 Sheets-Sheet 1

INVENTOR.
RICHARD P. HULSEBUS
BY
Wheeler, Wheeler & Wheeler
ATTORNEYS

Oct. 3, 1961 R. P. HULSEBUS Re. 25,048

OUTBOARD MOTOR TILT RELEASE

Original Filed Aug. 3, 1955 3 Sheets-Sheet 2

INVENTOR.
RICHARD P. HULSEBUS
BY
Wheeler, Wheeler & Wheeler
ATTORNEYS

Oct. 3, 1961 R. P. HULSEBUS Re. 25,048
OUTBOARD MOTOR TILT RELEASE
Original Filed Aug. 3, 1955 3 Sheets-Sheet 3
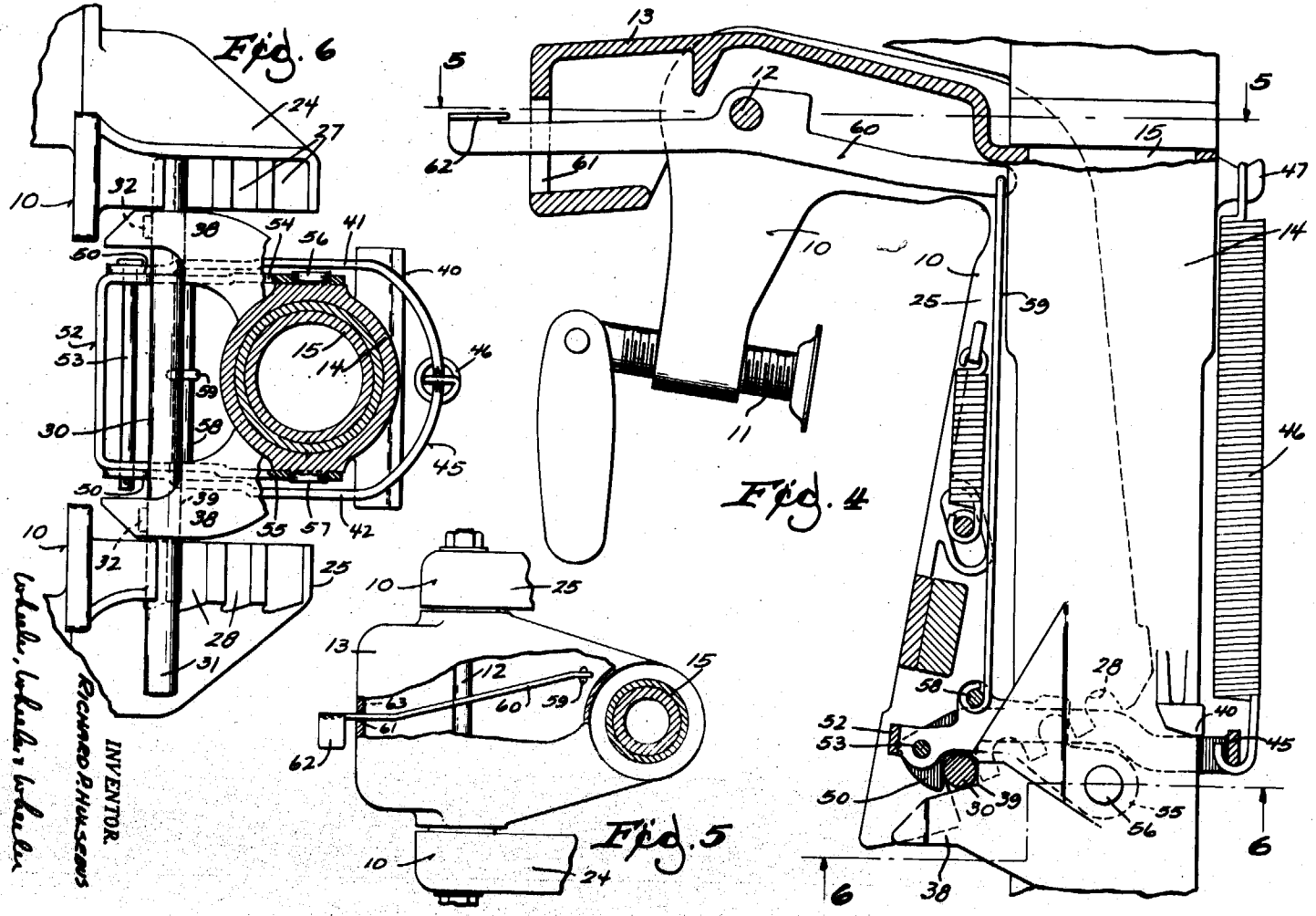
INVENTOR.
RICHARD P. HULSEBUS
Wheeler, Wheeler & Wheeler
ATTORNEYS United States Patent Office Re. 25,048
Reissued Oct. 3, 1961

25,048

OUTBOARD MOTOR TILT RELEASE

Richard P. Hulsebus, Waukegan, Ill., assignor to Outboard Marine Corporation, a corporation of Delaware Original No. 2,911,938, dated Nov. 10, 1959, Ser. No. 526,232, Aug. 3, 1955. Application for reissue June 21, 1960, Ser. No. 37,820
9 Claims. (Cl. 115—17)

Matter enclosed in heavy brackets [ ] appears in the original patent but forms no part of this reissue specification; matter printed in italics indicates the additions made by reissue.

This invention relates to an outboard motor tilt release.

The propulsion unit part of an outboard motor is pivoted to the transom bracket for tilting movement between a generally upright drive shaft position, in which the propeller is at normal depth beneath the surface of the water, and a tilted position in which the propeller and skeg swing upwardly in the surface of the water, or completely out of the water.

Obviously, tilting cannot be permitted freely in the case of a reversible outboard motor, since the propeller thrust in reverse would swing the unit upwardly to its inoperative position. It is, therefore, required that the propulsion unit be tiltable with respect to the transom bracket when a shoal is encountered or when it is desired to beach the boat, but that sufficient restraint against tilting be exerted to withstand propeller thrust in reverse.

In some [insallations] *installations*, in the past, a lock has been engaged as a prerequisite to the reversal of thrust to secure the parts against tilting, leaving them free at all other times. In the present device, it is desired to avoid the use of a separate lock. Hence, a detent is employed which has selective action sufficient to hold the reverse thrust but equipped to release when the skeg or propeller strike a submerged obstacle. This is very satisfactory except that the amount of restraint exercised by the selective detent makes it difficult to tilt the motor manually as a preliminary to beaching. Accordingly, the present invention provides a selective detent which can be manually disengaged for beaching purposes, the design being such that the detent offers little resistance to manual tripping but offers considerable resistance to its automatic release.

It is an object of the invention to provide selective action of the character described and to combine this with means by which the detent acts on a bar which is easily adjustable to predetermine the normal upright position of the motor from which it tilts to its inoperative position.

In the drawings:

FIG. 4 is a view on a considerably larger scale of the parts shown in FIG. 3, some of the parts shown in elevation in FIG. 3 being shown in section in FIG. 4.

FIG. 5 is a detail view on a reduced scale taken in section on the line 5—5 of FIG. 4.

FIG. 6 is a view taken in section on the line 6—6 of FIG. 4.

Figures 1, 7:
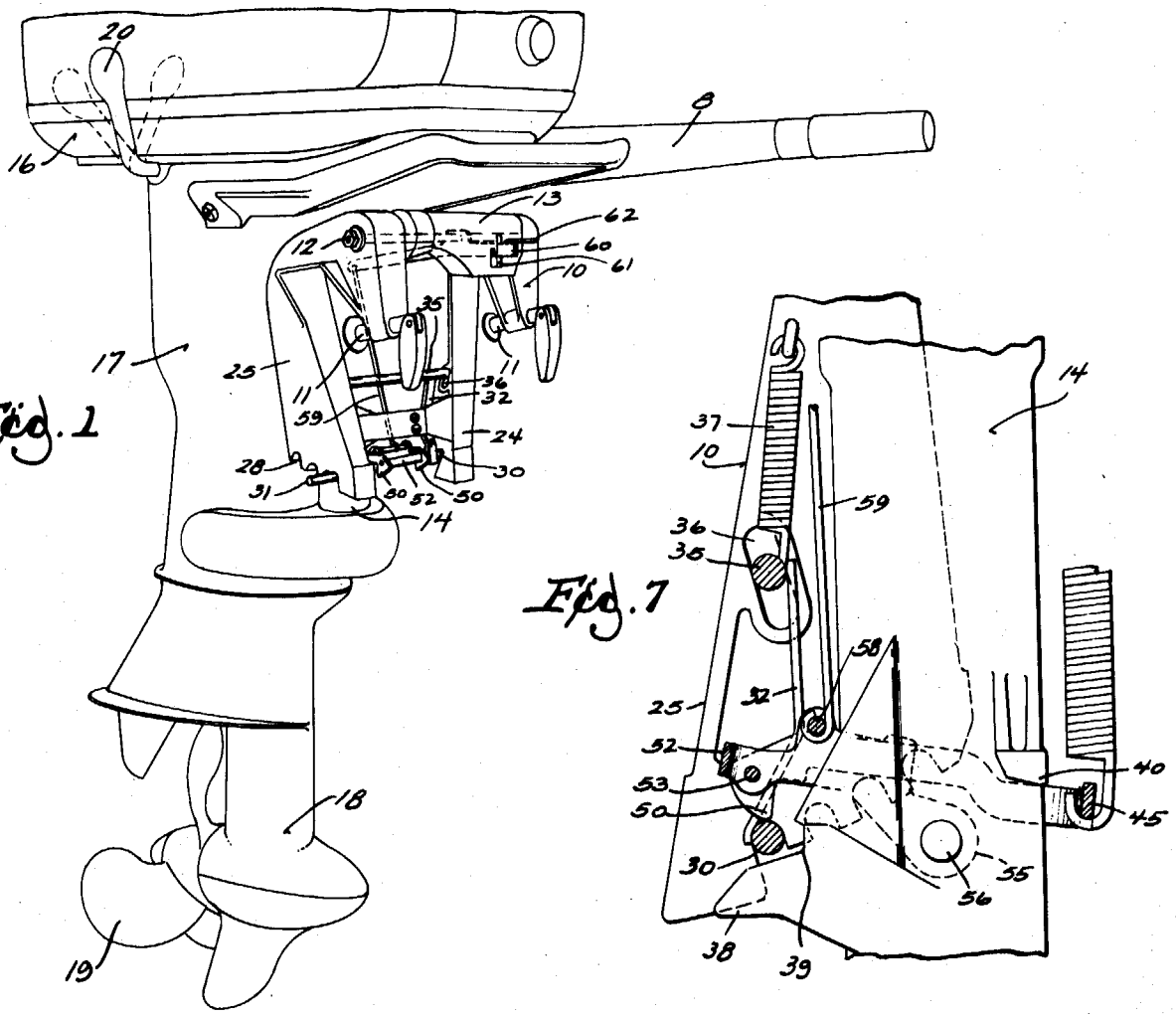
FIG. 1 is a forward view in perspective fragmentarily illustrating an outboard motor equipped with a detent embodying the invention.
FIG. 7 is a view similar to FIG. 4 showing the detent as it appears when tripped.

The outboard motor in general may be of any desired type. As illustrated, it comprises a transom bracket 10 having transom clamp screws 11 and a pintle 12 upon which is pivoted the bracket arm 13 of the swivel bearing 14 in which the kingpin 15 is rotatable on a generally upright axis in the steering of the propulsion unit.

The propulsion unit conventionally comprises a powerhead 16, housing 17 for the vertical drive shaft 9, and gear housing 18, all of which are in rigid unitary connection and subject to the control of a steering tiller [18] *8*. While the propulsion unit comprising the powerhead 16 and housing 17 and 18 is desirably unitary and rigid, the mounting of this unit upon the kingpin 15 may include resilient supports as disclosed particularly in Irgens and Watkins Serial No. 442,022, filed July 8, 1954 for a patent on vibration and sound damping outboard motor mounting. Since the resilient support forms no part of the present invention, it is not illustrated in this application. Any appropriate means may be used to reverse the direction of thrust of the propeller 19. This is conventionally done by adjusting a clutch (not shown) in the gear housing 18 to connect one or another of two driven bevel gears with the propeller shaft. The clutch is manipulated by a control lever 20 mounted at the side of powerhead and shown in FIG. 1 at its neutral position from which it may be oscillated forwardly for forward motion or rearwardly for rearward motion as shown in dotted lines in FIG. 1.

The propulsion unit has brackets at 21 and 22 connected to the upper and lower ends of kingpin 15 so that, upon oscillation of the kingpin by the tiller [18] *8*, the propulsion unit is turned from side to side for steering.

The present invention is concerned more particularly with the tilting of the propulsion unit respecting transom bracket 10. There are three principal circumstances under which this occurs; first, to adjust the propulsion unit to stand in its normally upright position with the propeller shaft horizontal; secondly, to permit the propulsion unit to tilt automatically when a submerged obstacle is encountered; and thirdly, to permit the propulsion unit to be tilted manually for beaching or shear pin repair or any other operation requiring that the propeller be lifted.

Figure 2:
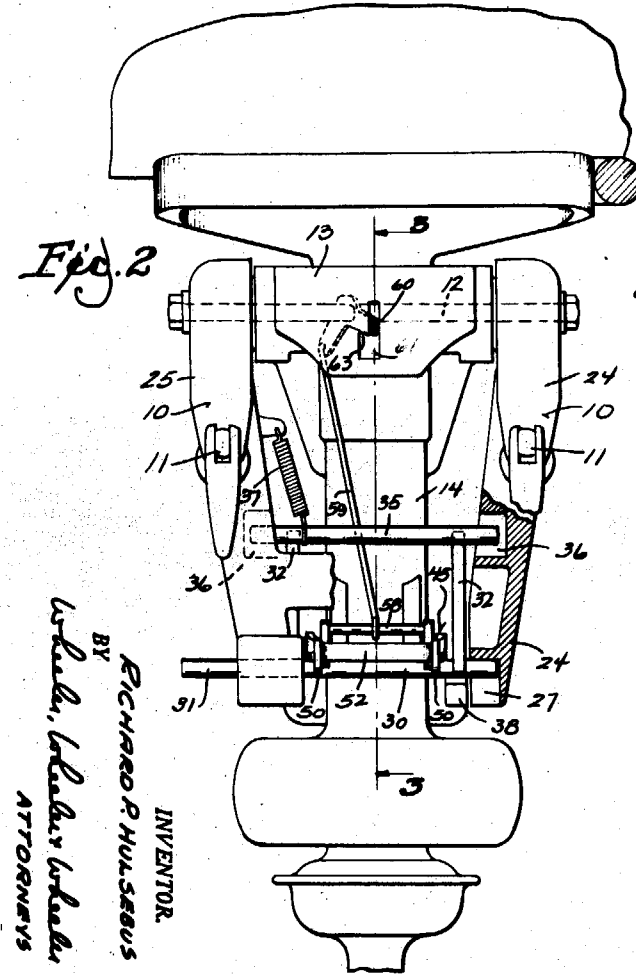
FIG. 2 is a view on a larger scale in front elevation, portions of the bracket being broken away.

The bracket 10 comprises rearwardly projecting and laterally spaced wings 24, 25 between which the propulsion unit is disposed as best shown in FIGS. 2, 4 and 6. The wing 24 has downwardly opening pockets at 27 and the wing 25 has oppositely disposed notches 28 aligned with the pockets to receive a keeper or cam bar 30 which has an end portion 31 serving as a handle and projecting from the notch in which the bar is disposed, whereby the bar may readily be adjusted forwardly and rearwardly in the series of registering pockets 27 and notches 28. A pair of straps 32 welded to the bar are connected at their upper ends to a cross pin 35 loosely confined within the bracket pockets 36 and subject to the action of supporting spring means 37, whereby the bar 30 will remain in any one of the notches to which it is adjusted. The bar 30 takes the normal forward propeller thrust for delivery through the bracket to the boat and through the latch means presently to be described.

The swivel bearing 14 is provided on its forward side with divergent arms 38 (FIG. 6) near the ends of which are provided saddles 39 engaging bar 30 (FIG. 4). Regardless of the position of the bar, as varied to compensate for various angles of the transom with which the bracket 10 may be engaged, any forward thrust of the propeller on the housings 18 and 17 of the swivel bearing 14 will necessarily be transmitted by the saddles 39 to the bar 30 and thence to the transom bracket 10 and the boat.

Figure 3:
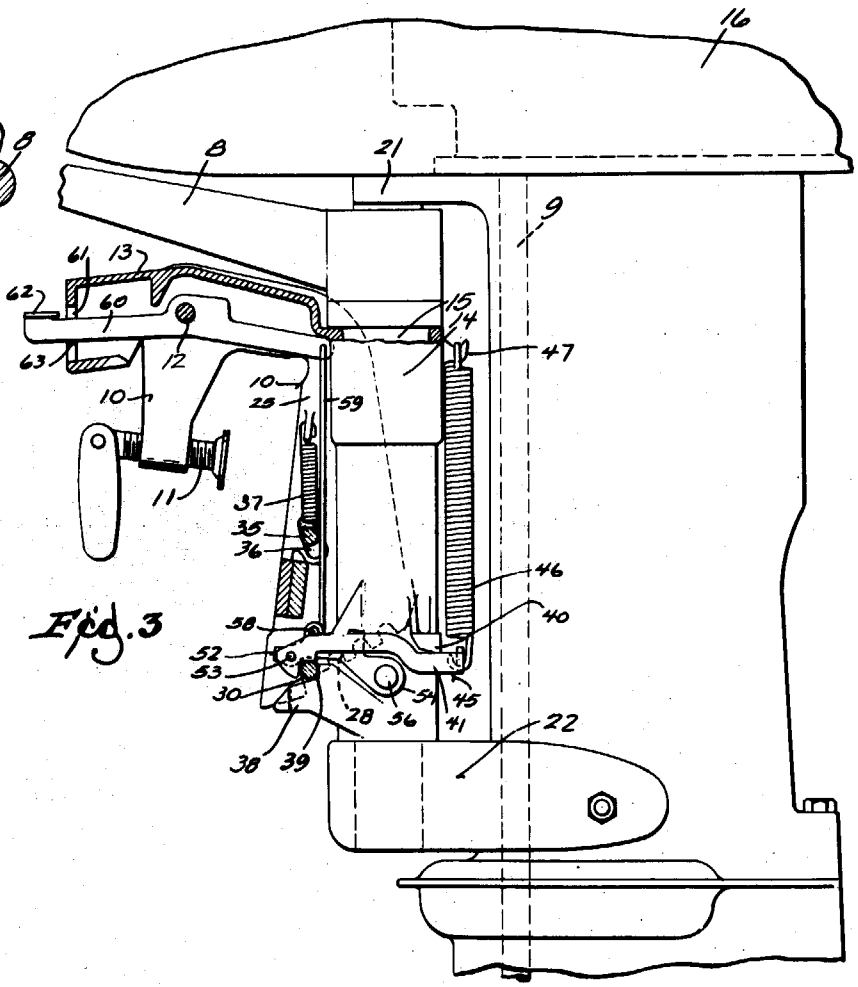
FIG. 3 is a fragmentary view of the outboard motor largely in side elevation, portions of the bracket being illustrated on the line 3—3 of FIG. 2.

Cast integrally on the rear side of the swivel bearing 14 is a transverse fulcrum member at 40 across the lower margin of which the two legs 41 and 42 of yoke 45 have a loose pivot bearing under the thrust of a supporting tension spring 46 having an anchorage at 47 on the rear side of the swivel bearing as best shown in FIG. 3 and FIG. 4. There is clearance between the swivel bearing 14 and the shaft housing 17 within which spring 46 is disposed. The bias of the spring is exterted on the yoke in a direction tending to oscillate the yoke counterclockwise as viewed in FIG. 4, whereby to maintain the hooks 50 at the free end of the yoke engaged over the adjustable bar 30 in the manner clearly illustrated in FIGS. 3 and 5.

The hooked terminal portions 50 of yoke 45 are connected with another yoke at 52 by means of a pin 53 best shown in FIGS. 4 and 6. Yoke 52 has its arms 54 and 55 pivoted on studs 56, 57 which project laterally from the swivel bearing 14 as best shown in FIG. 6. This latter yoke transfers the load imposed on the hook to the studs 56, 57 on swivel bearing 14. Yoke 52 also provides for manual disengagement of the hooks 50 when it is desired to completely free the propulsion unit from the restraint of these hooks. To this end, the cross pin 58 of yoke 52 is connected by a link 59 (FIGS. 2, 3 and 4) with a lever 60 pivoted on the horizontal pintle 12 upon which the propulsion unit tilts. Since the lever is thus pivoted co-axially with the axis upon which the propulsion unit tilts, there is no change of relative length of any part of the system. The lever 60 projects from arm 13 through an L-shaped slot 61 and is provided externally with an operative handle 62 conveniently accessible to the operator. The slot 61 has an offset portion provided with a seat at 63 beneath which lever 60 may be hooked in the downward position of the handle 62. In this position of the lever, the latch yoke 45 is completely disengaged from bar 30, leaving the propulsion unit free of anti-tilting restraint. The parts are shown in their disengagement position in FIG. 7.

With lever 60 in its normal position as shown in FIGS. 2, 3 and 4, the spring 46 maintains the hooked ends 50 of the detent yoke 45 latched about the adjustable bar 30. In this position of the parts, the detent is impositive in its action but offers sufficient resistance to displacement so that it is capable of withstanding any rearward thrust to which it may be subject by the propeller when the latter is operating in reverse.

However, it will be noted that hook 50 presents to keeper or cam bar 30 a cam follower surface which, under heavy pressure, will rotate clockwise about the pivot pin 53. The force at which hook 50 will begin to rotate is determined by the counteracting moment of the force of spring 46 which has a predetermined load in the installed position shown in FIG. 4. Under heavy camming pressure exerted by pin 30, the hook 50 will continue to rotate until the inclination of the hook surface with respect to the load line between studs 56, 57 and bar 30 is sufficient to permit the hook surface 50 to cam upward and out of engagement with bar 30. Thus it can be seen that a sufficiently strong blow rearwardly on the skeg of the gear housing or lower unit will result in the above action, whereby the propulsion unit is automatically free for tilting over the shoal or other obstacle.

Thus, an impositive detent is provided which is selective in its resistance to tilting, and one which does not foul readily in use and retains its characteristics without requiring adjustment. It does not yield when the motor is reversed but does yield in response to a sharp blow such as it receives when the boat to which the outboard motor is attached is in fairly rapid motion and the skeg encounters an obstacle. While it takes considerable pressure to dislodge the detent under these circumstances, the detent may nevertheless be released manually with perfect ease due to the fact that the manual control lever 60 acts directly on the detent lever with no camming action required for its operation, whereas the movement of the detent yoke to releasing position during normal operation can be effected only by a camming action.

Whenever the tilted propulsion unit is pivoted back to its normal position of use, the detent hook engages over the adjustable thrust bar of the bracket at the same time that the thrust saddles of the propulsion unit encounter such bar, thus automatically re-engaging the parts in the impositive detent mechanism.

I claim:

1. In an outboard motor, the combination with a bracket member and a propulsion unit member pivoted to the bracket member for tilting movement, of a detent hook adjustably mounted on one of said members, and a keeper mounted on the other of said members with which the hook is normally engaged, a spring biasing said hook into such engagement, said hook and keeper having complementary camming surfaces mutually releasable when said members are subjected to relative pivotal pressure in excess of the predetermined value and sufficient to displace the detent against the biasing means, a detent releasing lever connected with the detent and a remote operating handle connected with said lever for the transmission of motion therethrough to effect detent release.

2. In an outboard motor, the combination with a transom bracket provided with rearwardly projecting wings and a thrust member extending transversely between the wings for which said wings provide adjustable support, a propulsion unit having pivotal connection with the bracket and having a thrust pad normally seated against said member and movable away from said member upon the tilting of the propulsion unit respecting the bracket, detent lever means pivotally mounted upon the propulsion unit and having camming surfaces for which the thrust member of the bracket is provided with complementary surfaces, biasing means acting upon said detent lever in a direction to maintain the respective surfaces engaged the bracket wings being provided with downwardly opening notches, the thrust member comprising a bar selectively positioned in certain of said notches, and spring means for supporting such bar in the selected notches, the detent [hook] *lever* means being directly engaged with said bar.

3. In an outboard motor, the combination with a bracket unit provided with a transverse pintle, of a propulsion unit comprising a swivel bearing having an arm pivoted upon the pintle, and further comprising a power unit drive shaft housing and gear housing in unitary connection and provided with a kingpin oscillatable in the swivel bearing for steering, a thrust member adjustable fore and aft upon the bracket unit and for which the propulsion units is provided with a saddle engaging said member to define the normal position of the propulsion unit from which it is tiltable, one of said units comprising a detent and the other a keeper, the detent and keeper having complementary surfaces normally engaged to preclude tilting movement of the propulsion unit in a direction to disengage its saddle from said member, said surfaces having a camming inclination such as to automatically disengage them when excessive relative pressure is developed in a direction tending to tilt the propulsion unit.

4. The device of claim 3 in which the keeper comprises a surface of said thrust member, the detent comprising a lever pivotally mounted on the swivel bearing and provided with a spring anchored on the swivel bearing and acting on the detent lever in a direction to maintain its engagement with the keeper.

5. The device of claim 4 in further combination with a second lever pivotally connected with said swivel bearing and connected with the detent lever and provided with a remote handle and operating connections for actuating the detent lever in a releasing direction against the bias of said spring.

6. In an outboard motor the combination with a mounting bracket having an adjustable thrust receiving member and a propulsion unit member tiltably pivoted to the mounting bracket for movement to a position predetermined by the adjustment of the thrust receiving member, of detent means movably connected with one of said members, the other of said members comprising a keeper to and from which the detent means is movable, said detent means and keeper having normally engaged cam surfaces at such relative angles as to be self-disengageable under excessive thrust, means biasing said detent means toward said keeper and means for manually retracting the detent means to disengage said surface.

7. The device of claim 6 in which said detent means comprises a hooked lever connected with the propulsion unit member, the keeper comprising a cross bar adjustably fixed to the mounting bracket member and over which the hook of said lever is normally engaged.

*8. In an outboard motor the combination with a bracket member and a reversible propulsion unit member in tiltable pivotal connection with the bracket member, of releasable detent means for resisting tilting movement of the propulsion unit member under all conditions of forward and reverse operation thereof, said detent means comprising a hook adjustably mounted on one of said members and a keeper mounted on the other of said members and with which said hook is normally engaged, a spring biasing said hook into such engagement,*

*said hook and keeper having complementary camming surfaces mutually releasable when said members are subjected to relative pivotal pressure in excess of a predetermined value sufficient to withstand all normal operating thrust, said camming surfaces being effective to displace the detent against the biasing means only under conditions of abnormal thrust, a detent releasing lever, and a remote operating handle connected with said lever for the transmission of motion therethrough to effect detent release.*

*9. The device of claim 8 wherein said propulsion unit member is free at all times to tilt respecting said bracket member, in reverse as well as in forward operation of said propulsion unit, upon release of said detent means.*

References Cited in the file of this patent or the original patent

UNITED STATES PATENTS

| | | |
|---|---|---|
| 1,278,585 | Buehner | Sept. 10, 1918 |
| 2,071,634 | Irgens | Feb. 23, 1937 |
| 2,116,146 | Gondek | May 3, 1938 |
| 2,583,910 | Watkins | Jan. 29, 1952 |
| 2,646,238 | Kircher et al. | July 21, 1953 |
| 2,684,044 | Kiekhaefer | July 20, 1954 |